United States Patent
Wyden

[11] 3,886,760
[45] June 3, 1975

[54] METHOD OF INDIRECT HEAT EXCHANGE
[76] Inventor: Stephen Wyden, 1158 E. 8 St., Brooklyn, N.Y. 11230
[22] Filed: Sept. 3, 1970
[21] Appl. No.: 70,299

[52] U.S. Cl. .................... 62/114; 62/467; 165/1
[51] Int. Cl. .............................. F25b 1/00
[58] Field of Search .......... 62/114, 64, 1; 165/1; 62/467

[56] References Cited
UNITED STATES PATENTS
2,153,644  4/1939  Schierenbeck.................... 165/1 X
3,547,185  12/1970  Eissenberg...................... 165/133 X
3,566,514  3/1971  Szumigala....................... 165/133 X FOREIGN PATENTS OR APPLICATIONS
1,121,909  7/1968  United Kingdom................... 165/1

Primary Examiner—Meyer Perlin
Attorney, Agent, or Firm—Stephen Wyden

[57] ABSTRACT

A method of indirect heat exchange using a fluid comprising a gas and a liquid combined or entrained together. This fluid can take the form of a foam, or an aerosol, and its effectiveness can be facilitated by means of electrostatic forces and other devices.

24 Claims, 7 Drawing Figures

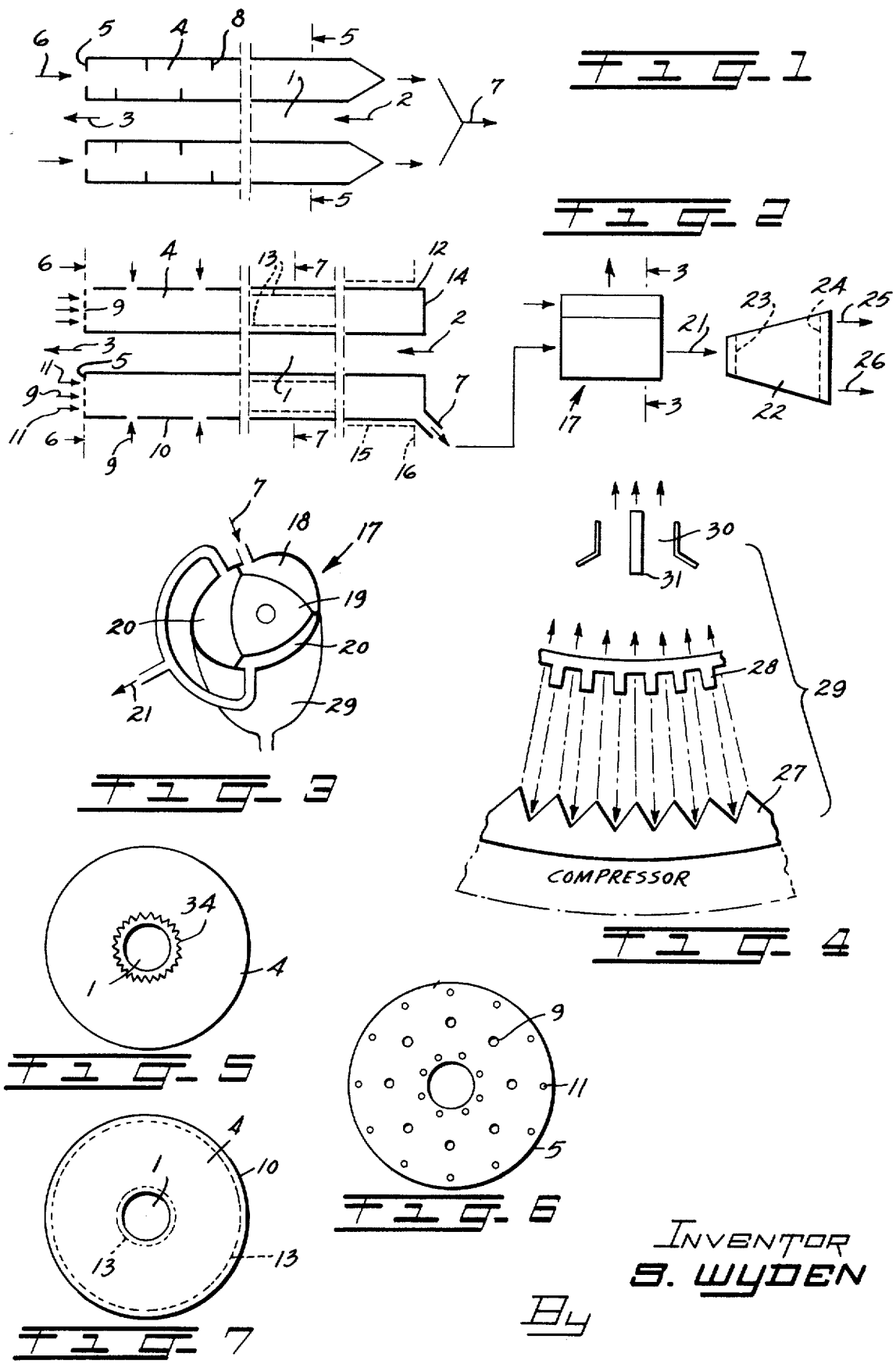

METHOD OF INDIRECT HEAT EXCHANGE

I have invented an improvement in cooling systems and more particularly a new and novel means of indirect heat exchange. One of the problems with current methods of cooling is that they either use inefficient, low heat absorbing materials or else they use efficient heat absorbers in an inefficient manner. I propose an approach that will maximize the efficiency obtainable from good absorbers and will help to introduce the heat absorber into the system at a rate at which it can be effectively utilized with minimal waste. Furthermore, recovery, of much of the absorbed heat is possible and minimal energy losses can be achieved in my system if both the heat absorption and recovery phases are used. Also, in one form of this invention, the coolant at the end of the cycle may be directly available as an energy source for certain applications, as, for example, spacecraft propulsion and plasma chemical reactions.

Fluids have been used for heat absorption for a long time. The standard chemical condenser has long used water as a heat absorbing medium. Also cool air has long been used as a cooling medium, especially since its expansion as it heats up helps it to flow and, therefore, we see its familiar cooling properties in air cooled engines and in indirect heat exchange or dry cooling towers. Water has been combined with air as a cooling medium in the form of a spray designed to impact on a material and by evaporating in contact therewith to cool the material.

My invention consists of the use of a two-phase fluid, usually comprising a gas and a liquid together, with one entrained within the other as an indirect coolant. Several advantages to this type of coolant are noteworthy. There is no problem of coolant liquids contaminating or damaging the material being cooled. The proportions of the liquid-gas phases can be varied to accomodate varying heat absorption requirements. The efficiency of this coolant will exceed that of the gas alone. Using liquid alone one cannot recover from the coolant the heat it has absorbed from the material because liquids are non-compressible. The dispersal of the liquid increases its surface area and thereby increases its heat absorption capacity per unit liquid while also serving as a heat sink for the gas vehicle. With this increased heat absorption capacity is retained the compressibility property of gases — permitting recovery of a portion of the heat absorbed by compression of the output coolant fluid, something not possible with a completely liquid coolant.

There are several ways of cooling the liquid and gas components, although these enumerations are not to be considered as restricting the meaning of my invention. In one embodiment, the gas is entrained in the liquid, usually by adding a surface tension lowering agent to the liquid. In terms of its discharge, except where bubbles would be of value, such a system would require heat recovery from the coolant and recycling of the coolant. Another approach is the entrainment of the liquid in the gas in the form of an aerosol. The use of an aerosol lends itself to several embodiments and applications, some of which will be enumerated.

In one embodiment, in contact with the surface that encases a material to be cooled an aerosol is introduced which will absorb heat from the material. At the end of the pathway of contact between the coolant and material the cooling fluid is directed to a compressor to recover the absorbed heat. The formation and maintenance of the aerosol can be facilitated by the application of electrostatic forces to the aerosol generating systems and incorporated in the indirect contact pathway. Contact between the liquid particles and the contacting surface can be minimized by similar electrostatic forces on or near such surfaces and/or by a moving gas layer near said surface, generated by a compressed gas flow; another means of minimizing contact of the liquid with the surface involves the texture of the contact surface, as, for example, the surface shapes involved in an-isothermic heat transfer system of the non-wettability of said surface due to chemical treatment thereof.

The heat-laden coolant discharge can be treated in several ways. First, much of the absorbed heat can be removed by compression, wherein the heat can be used for other applications; permitting the compressed fluid to expand after heat exchange should further cool the fluid and cause precipitation and/or condensation of liquid particles, which if the aerosol is not to be resued can be further precipitated by electrostatic precipitators or similar filter devices. The cooled gas, if it is air, might then be discharged into the atmosphere. There are some uses for the discharge: if an electrostatic system is employed, the discharge may consist of high charge density particles, especially if the coolant has traversed a long pathway — such particles are known to have both military and non-military applications including various acceleration devices. The heat recovery compressor can be used in conjunction with a focusing anisotherm heat exchange surface to generate an energy rich beam of molecules for diverse application including acceleration propulsion, and chemical reactions. Furthermore, the cooling effects of the expanding, spent cooling gasses can serve as a quenching medium in such chemical reactions.

The accompanying drawings illustrate several embodiments of my invention.

FIG. 1 represents a simple embodiment of my invention, comprising a coolant surrounding, indirectly, a material to be cooled.

FIG. 2, represents a form of my invention designed for use with an aerosol.

FIGS. 3, 4, and 5 show details of some of the structures.

FIG. 6, is a section of FIG. 2 in the plane VI—VI.

FIG. 7 is a section of FIG. 2 in the plane VII—VII.

FIG. 1 is an indirect cooling system wherein the material to be cooled is in a chamber 1 fed at one end 2 and discharging at another end 3 surrounded by a heat absorbing chamber 4, in a side wall of the heat absorbing chamber 5 is a coolant injection nozzle 6 of a plurality thereof and at the other end of the condenser is an outlet for the coolant 7. There may be baffles 8, whereby the contact time of the coolant with the material being cooled can be lengthened.

FIG. 2 illustrates a system employing a revised version of my invention and a heat recovery system wherein 1 is a chamber holding the hot material having an outlet 3 and inlet 2 surrounded by a heat absorbing chamber 4, the side walls of the heat absorbing chamber 5 has an aerosol inlet 9 or a plurality thereof, the plurality might include aerosol inlets 9 in the outside side walls 10.

Where electrostatics are employed, air inlets 11 would minimize the direct contact of the aerosol with the surface of the hot material chamber. In electrostatically regulated applications an electrode set in the aerosol inlet 9 would be electrically insulated from the sidewall 5 which would be, in turn, insulated 12 from the outside side walls 10. In order to minimize contact of the aerosol with the inter-face surface, an electrostatic mesh 13 may be provided. The opposite sidewall 14 electrically insulated 12 from the outside sidewalls 10 and the electrostatic mesh 13 would be so charged as to attract the aerosol and guide it to the outlet 7, for which purpose electrostatic field guides 15 may be provided along said outlet side walls 10 and especially so 16 near the end wall 14. An outlet from the cooling chamber 7 connects with a compressor 17, to be described later. The compressor outlets 21 lead to an expansion chamber 22, near the entrance is a filter-precipitator 23 especially good for foam versions of the invention, and near the area of maximal expansion is an aerosol and particulate precipitator 24 leading to a cool gas discharge 25 and to a liquid discharge 26.

FIG. 3 is taken from FIG. 2 in the plane III—III passing through the compressor 17 and a heating chamber 29 formed in the wall of the compressor in the area of the compressor of maximum compression. The compressor is prefereably of the rotating compressor type, comprising a central cavity 18 within which a rotating member 19 would define the intake 18, compression 20, and exhause compression 20' segments of the compressor. The area of maximum pressure 20, also being the area of maximal heat intensity, is cooled by heat exchange with the heating chamber 29.

The heating chamber is described in FIG. 4, also in the III—III plane of FIG. 2. The common wall between the compression chamber 20 and the heating chamber 29 may facilitate heat exchange best if the heating chamber surface 27 is of anisothermic heat exchange design (which means that the heat exchange surface is maintained at a thermal gradient, the hotest parts being the peaks most distant from the heat source, causing the cooling liquid to leave the hot surface in jets, (cf. C. A. Beurtheret, U.S. Pat. No. 3,367,415) and the cooling material is introduced through a jet or jets 28 so as to land in the troughs of the depressions in the common wall 27. Expand and heated gases are focused by the surface 27 and collect in the chamber 29 and are discharged through the constricted opening 30 and may be charged by an electrostatic electrode 31 during passage through the constriction.

FIG. 5 is a cross-section of the heat exchanger in FIG. 1 along the line V—V. It illustrates the use of anisothermic heat exchange fins 34, which, by their ability to force the coolant to jet away from the hot surface, tend to minimize the contact of the aerosol directly with the wall of the chamber containing the hot material 1.

FIG. 6 is a section of FIG. 2 in the plane VI—VI. It illustrates the possible distribution of a plurality of coolant inlets 9 and of air inlets 11.

FIG. 7 is a section of FIG. 2 in the plane VII—VII and indicates the relative locations of the aerosol repulsion meshes 13 which would let the fluid pass through easily, while repelling the charged particles, therein, by its charge. With the foregoing drawings in mind, my invention and several of its embodiments shall be described.

The simplest embodiment of my invention comprises a material to be cooled 1 in contact through a surface with a coolant, itself in another chamber 4, wherein the coolant comprises a fluid which in turn comprises a liquid and a gas, one entrained within the other. All the other embodiments represent modifications of this principle or are means by which to complete the system wherein this invention is used. These modifications include:

The use of baffles 8 to increase the contacting path-length of the coolant (in chamber 4) with the material (in chamber 1), especially of value with the foam form of the invention.

The application of a nonwettable coating to the inter-face surface of chamber 4 to minimize contact of the coolant with the interface surface shared with chamber 1.

The formation of (anisothermic) fins 34 in the inter-face surface of chamber 4 in order to minimize contact of the coolant with the interface and to maximize heat exchange therewith, because of its heat gradient which will tend to force the cooling fluid contacting the wall to move back into the coolant chamber.

The use of additional jets of aerosol 9 during the flow of the aerosol, from the sidewalls 10, to maximize the heat absorption of the aerosol, by maximizing the quantity of liquid that can be entrained.

The use of a gas stream (from jets 11) to minimize aerosol (from jets 9) contact with the interface surface of chamber 4.

The use of electrostatic charge inducing electrodes in the aerosol inlets 9 to electrostatically charge the aerosol and oppositely charged or grounded plates to attract the aerosol at the discharge end (sidewall 14) of chamber 4.

The use of electrostatic field guides 15 along the path of the aerosol to maintain and direct the flow of the aerosol.

The use of charged mesh 13 to minimize contact of the charged aerosol with the interface surface of chamber 4.

Discharging the used coolant to a compressor 17 for recovery of the absorbed heat in the coolant.

Discharging the compressor cooled, compressed coolant into an expansion chamber for expansion-cooling and precipitating of liquids and separating liquids from gases for recycling or discharge of the components.

The use of the expansion chamber or its contents for cooling or reaction quenching purposes.

The provision in the compressor 17 adjacent to the segment of maximum compression 20, and therefore of maximum heat intensity, of a chamber 29 for generating a beam of molecules or droplets, itself capable of being charged 31.

Quenching the molecular beam reactions with the output of the expansion chamber, directly or indirectly.

The method can be further described by explaining how an embodiment might work. We will follow the process in FIG. 1 and continue the process in FIG. 2, which is a more complete illustration. In FIG. 1, the coolant fluid (probably a foam) enters the cooling chamber 4 under a very small positive pressure and flows along the length of the chamber and around the baffles. As the fluid flows it will absorb the heat from the material in chamber 1, which is flowing in the opposite direction. The absorbed heat will vaporize some of the liquid, increasing the pressure in chamber 4 and requiring a higher input pressure for the cooling fluid as regular operating conditions are reached. Near the area where the cooling fluid leaves and the materials to be cooled enter chamber 1, baffles may not be necessary in chamber 4 for sufficient heat exhange. Finally, the coolant leaves chamber 4 at 7, the size of the exit opening 7 contributing to the actual operaing pressure in chamber 4, the smaller the opening, the higher the pressure. The path the used foam coolant takes after leaving the exit 7 is the same as is followed by an aerosol coolent and is illustrated in FIG. 2.

The first part of FIG. 2 can be best explained in terms of an electrostatically charged aerosol being introduced into a cooling chamber 4 and directed by an electrostatic charge field 13, 15, 16 to the exit opening 7. The liquid and gas are mixed to form an aerosol in aerosol spray nozzles 9. An aerosol is usually generated by forcing a stream, consisting of a liquid and a gas, through a narrow orifice, under pressure, whereby the liquid emerges in minute droplets which tend to remain in suspension in the flowing gas stream. Machines are available on the market for such purposes. One combination that can be used as the aerosol is air and water. If an electrostatic electrode is present in the nozzle, the areosol may be electrostatically charged. In order to collimate the aerosol flow, straight gas may be introduced at nozzles 11. Additional aerosol can be added from the sides of the chamber 4 through additional nozzles 9. As with the foam system, the initial pressure in the system will depend on the pressure at the nozzles, length of the chamber 4 and the size of the exit opening 7. The pressure should increase as heat is absorbed from the material in chamber 1. In order to keep the particulate phase (aerosol droplets) of the cooling fluid moving along the length of the chamber 4, an electrostatic field may be set up by a set of porous meshes 13 as illustrated in the middle part of chamber 4. The particles which may become smaller in size near the end of chamber 4, may be focused towards the exit opening by another set of field guides 15, 16 near the end of chamber 4. The electrostatic guiding plates may be charged metal plates of sufficient size and proximity to the collant chamber to, by their charge, affect the flow of the aerosol coolant. The plates would function in a manner similar to the method in focusing an image on a television tube face.

Whether the used coolant is leaving the chamber illustrated in FIG. 1 or chamber 4 of FIG. 2, from the outlet 7 the fluid is carried to a compressor 17 to extract the heat from the coolant and, from there, the compressed gas is discharged through an expansion chamber 22 designed to expand and cool the fluid while separating it into gas and liquid components.

The fluid leaves the heat exchange chamber at the exit 7 under pressure due to the pressure at which it was introduced at 9, increased temperature from passage through the heat exchanger and increased gas due to conversion of liquid to gas during passage of the fluid through the exchanger. In the compressor 17 the pressure will be further increased and thereby its temperature will go up. Some of this heat can be reduced and recovered by a heat exchanger incorporated into the compressor (the top of 17 in FIG. 2, chamber 29 of FIG. 3, and the details of FIG. 4, refer to this heat exchanger). The cooled, highly compressed fluid is discharged via tube 21 to the expansion chamber 22 where it is allowed to expand and thereby cool itself and, in the process, separate the liquid and gas states. If the gas and liquid are air and water, they may be discharged or recycled at will. The expansion chamber 22 may be used to pre-cool the coolant fluid before entering chamber 4.

While any compressor could be used for 17, a rotating compressor would be most efficient and one is illustrated in FIG. 3. The used coolant from 7 enters the compressor 17 in the intake area 18 and as the segment of the piston forming segment 18 is rotated so that it is in position to form segment 20 it compresses the fluid and then the fluid can be discharged via 21 to the expansion to be further cooled and expanded. The efficiency of the compressor 17 may be increased and its output made more useful by constructing a heat exchange chamber 29 over the area of maximum compression and therefore of maximum temperature (the wall between chamber 29 and the compressor 17 would be, if not cooled, the hotest area in the system, except possibly for the intake chamber 1). If, as illustrated in FIG. 4, the wall between the compressor and chamber 29 is shaped to form anisothermic fins, then the coolant in chamber 29 may leave the chamber as a vaporized stream and it might even be charged by an electrode 31.

Thus the material in chamber 1 has been cooled, the coolant in chamber 4 has been cooled and separated, if necessary, into liquid and gas components, and a high temperature heat source has been formed (the output of chamber 29).

While the invention has been described with respect to certain exemplary embodiments thereof, it will be apparent to those skilled in the art that numerous variations and modifications may be made within the spirit and scope of the invention, and, thus, it is intended that all matter contained in the above description or shown in the accompanying drawings shall be interpreted as illustrative and not in a limiting sense.

Having described my invention, what I claim as new and desire to secure by Letters Patent is:

1. A method of heat exchange wherein the coolant is a fluid, comprising a two phase mixture, wherein one phase is a gas, either an aerosol or foam, comprising the steps of:

passing the coolant into a chamber in direct contact with another chamber containing a material to be cooled, permitting thermal exchange between the coolant and the material through the wall between the two chambers, removing the coolent after absorbing the heat of the material, and compressing the coolant, thereby maximizing the heat absorption and heat release capabilities of the coolant and utilizing the compressibility of the fluid.

2. An apparatus for cooling materials which comprises:

a chamber for a material to be cooled, means for forming a fluid, comprising a two phase mixture wherein one phase is a gas either an aerosol or a foam, connected to a chamber for the coolant fluid with at least one wall common to both the material and the coolant chambers, an outlet from the coolant chamber for the used coolant connected to a compressor, wherein the absorbed heat of the coolant may be recovered, and a means of discharge connected to an outlet of the compressor.

3. The apparatus of claim 2 wherein a non-wettable coating is applied to the wall of the coolant chamber, whereby contact between the coolant and the wall is minimized.

4. The apparatus of claim 2 wherein the wall common to both chambers is contoured to facilitate heat exchange and minimize contact of the coolant with said wall.

5. The apparatus of claim 4 wherein the contours are designed to facilitate anisothermic heat exchange.

6. The apparatus of claim 2 wherein,
the coolant is said aerosol,
said aerosol inlet is at one end of the common pathway of the material to be cooled and the coolant,
said aerosol outlet is at the opposite end of said common pathway.

7. The apparatus of claim 6 wherein additional aerosol inlets are inserted in an outside side wall.

8. The apparatus of claim 6 wherein gas inlets are inserted in the same wall as the aerosol inlets between said aerosol inlets and the common wall with the material to be cooled.

9. The apparatus of claim 6 further comprising:
means for electrostatically changing the incoming aerosol, and
means for oppositely charging the discharge end of the chamber.

10. The apparatus of claim 9 further comprising means for electrostatically guiding the aerosol attached to the outside side wall, whereby the flow and direction of the aerosol is regulated.

11. The apparatus of claim 9 further comprising means for concentrating said charge discharge into a narrow, densely charged beam.

12. The apparatus of claim 9 wherein electrostatic means are provided, within the coolant chamber, of the proper charge, to minimize direct contact of the aerosol with the interface surface.

13. The apparatus of claim 12 wherein the means comprises an electrostatically conductive mesh.

14. The apparatus of claim 2 further comprising means for separating the components of the cooling fluid and precipitating the non-gaseous components attached to said outlet from the coolant chamber.

15. The apparatus of claim 2 further comprising:
said outlet of the compressor connected to an expansion chamber,
means for separating the components of the cooling fluid within said expansion chamber, an outlet for said gas, and and outlet for the other component of the fluid.

16. The apparatus of claim 15 further comprising:
a wall of said compression chamber under maximum compression in contact with another material for best exchange therewith.

17. The compressor of claim 2 comprising:
a housing,
an inlet for a fluid to be compressed in the housing,
a chamber with the housing,
a rotating member therein, defining a plurality of subchambers,
an outlet from the compressor in the area of a subchamber not functionally near the inlet,
a second chamber formed with the wall of the housing adjacent to the compressed fluid,
a surface of said second chamber adjacent to the compressed fluid contoured to facilitate anisothermic heat exchange with the compressed fluid within the housing, an inlet into said second chamber for a material to be heated by said anisothermic heat exchange surface, and
an outlet from said second chamber formed by constriction of the walls adjacent to the exchange surface.

18. The compressor of claim 17 further comprising an electrostatic charging means in said second chamber outlet.

19. The compressor of claim 17 further comprising an expansion chamber connected to the outlet of the chamber within the housing.

20. The compressor of claim 19 further comprising means for combining the outputs of the outlet of the housing with the output of the outlet of the second chamber.

21. A cooling apparatus as in claim 2 based on a foam fluid, comprising:
a housing forming two chambers separated by an interfacing surface,
an inlet in a first compartment for a material to be cooled,
an outlet at the opposite end of said first chamber for the cooled material,
an inlet in a second chamber near the outlet of the first chamber for a foam fluid,
an outlet from the second compartment near the inlet of the first compartment for the spent foam,
a non-wetting coating on the inside surfaces of the second compartment,
a means for compressing the spent foam, connected to the outlet of the second compartment,
an expansion chamber connected to the means for compressing the spent foam wherein the compressed foam can expand and cool, and
a means for separating the components of the expanded, cooled foam.

22. A cooling apparatus as in claim 2, based on an aerosol fluid comprising:
a housing forming two compartments separated by an interfacing surface,
an inlet in a first compartment for a material to be cooled,
an outlet at the ooposite end of said first chamber for the cooled material,
an inlet in a second chamber near the outlet of the first chamber for an aerosol fluid,
an outlet at the opposite end of said second chamber for the aerosol fluid
means for electrostatically charging said aerosol as it enters said second chamber,
electrostatic guides surrounding said second chamber, whereby the flow and direction of the aerosol is regulated,
means for electrostatically attracting said aerosol to the discharge end of said second chamber,
a means for repelling said aerosol from direct contact with the interfacing,
means for concentrating the charge discharge of said second chamber, whereby forming a narrow, densely charged beam,
valve means for diverting the discharge of the second chamber, means for compressing said discharge attached to an outlet of said valve means,
means for forming a separate charged gas beam from heat exchange with said compressed discharge, an expansion chamber for cooling said compressed discharge attached to said compressing means, means for separating the components of the aerosol attached to the expansion chamber, means for connecting the expansion chamber to the separate charged gas beam, whereby the effects of the beam can be quenched, and means for discharging the contents of the expansion chamber.

23. In the method of claim 1 the additional steps of:

expanding and cooling the compressed coolant, separating the phases of the expanded coolant, and recycling of the coolant component phases or discharge of the components with minimum contamination of the environment.

24. A method of heat exchange using an electrostatically charged aerosol as the coolent, comprising the steps of:

forming an aerosol and electrostatically charging the aerosol, passing the aerosol through a chamber in direct contact with another chamber containing a material to be cooled, providing means along the chamber for guiding the aerosol, permitting exchange between the aerosol and the material to be cooled through the wall between the two chambers, removing the aerosol after absorbing the heat of the material, and means of discharging the aerosol and the charge on the aerosol connected to the means for removing the aerosol.

* * * * *